United States Patent
Sztyler et al.

(10) Patent No.: US 12,417,232 B2
(45) Date of Patent: Sep. 16, 2025

(54) INFORMATION AGGREGATION IN A MULTI-MODAL ENTITY-FEATURE GRAPH FOR INTERVENTION PREDICTION

(71) Applicant: NEC Laboratories Europe GmbH, Heidelberg (DE)

(72) Inventors: Timo Sztyler, Heidelberg (DE); Carolin Lawrence, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 47 days.

(21) Appl. No.: 18/288,830

(22) PCT Filed: May 17, 2021

(86) PCT No.: PCT/EP2021/063020
§ 371 (c)(1),
(2) Date: Oct. 30, 2023

(87) PCT Pub. No.: WO2022/242827
PCT Pub. Date: Nov. 24, 2022

(65) Prior Publication Data
US 2024/0211480 A1  Jun. 27, 2024

(51) Int. Cl.
*G06F 16/20* (2019.01)
*G06F 16/2457* (2019.01)
*G06F 16/28* (2019.01)

(52) U.S. Cl.
CPC ...... *G06F 16/24578* (2019.01); *G06F 16/285* (2019.01)

(58) Field of Classification Search
CPC . G06F 16/24578; G06F 16/285; G06N 3/045; G06N 3/08
See application file for complete search history.

(56) References Cited

U.S. PATENT DOCUMENTS 8,294,763 B2 * 10/2012 Cheng ............... G06T 7/20
348/143
12,106,217 B2 * 10/2024 Creed ............... G06F 17/16
(Continued)

OTHER PUBLICATIONS

Article entitled "Sensor-based Human Activity Recognition: Overcoming Issues in a Real World Setting", by Sztyler, dated 2019 (Year: 2019).*

(Continued)

*Primary Examiner* — Mahesh H Dwivedi
(74) *Attorney, Agent, or Firm* — Leydig, Voit & Mayer, Ltd.

(57) ABSTRACT

A method for providing event-specific intervention recommendations includes identifying, based on an event trigger, one or more sensors, determining, by processing data streams provided by the identified sensors, a set of event related entities and constructing, for each entity of the determined set of entities, an associated feature vector of the entity's features, generating, based on the determined entities and their respective feature vector, an entity-feature-graph, computing, by performing graph classification of a predefined set of allowed interventions based on a trained graph classification model, a ranked list of interventions; and selecting, according to predefined rules, one or more interventions from the ranked list of interventions and providing the selected interventions as recommended interventions for execution. The method can be used to support decision making.

16 Claims, 4 Drawing Sheets

(56) References Cited

U.S. PATENT DOCUMENTS

| | | | | |
|---|---|---|---|---|
| 2006/0004579 | A1* | 1/2006 | Claudatos | G08B 13/19695 |
| | | | | 704/270 |
| 2015/0248533 | A1* | 9/2015 | Sudharsan | G06N 7/01 |
| | | | | 705/3 |
| 2017/0041524 | A1* | 2/2017 | Schoenen | H04N 5/2256 |
| 2018/0293221 | A1 | 10/2018 | Finkelstein et al. | |
| 2019/0065249 | A1* | 2/2019 | Cheng | G06F 9/4881 |
| 2020/0065668 | A1* | 2/2020 | Garcia Duran | G06N 5/02 |
| 2020/0137083 | A1 | 4/2020 | Chen et al. | |
| 2021/0095982 | A1* | 4/2021 | Kahn | G01C 21/362 |
| 2021/0149993 | A1* | 5/2021 | Torres | G06N 3/045 |
| 2021/0279603 | A1* | 9/2021 | Teran Matus | G06V 20/40 |

OTHER PUBLICATIONS

Article entitled "POLARIS: Probabilistic and Ontological Activity Recognition in Smart-homes", by Civitarese et al., dated 2019 (Year: 2019).*

Girshick, Ross et al.; "Rich feature hierarchies for accurate object detection and semantic segmentation"; *2014 Proceedings of the IEEE Conference on Computer Vision and Pattern Recognition*; Oct. 22, 2014; pp. 1-21; vol. 5; ArXiv.org, Cornell University; Ithaca, NY, USA.

Sharifzadeh, Sahand et al.; "Classification by Attention: Scene Graph Classification with Prior Knowledge"; *Proceedings of the 35th AAAI Conference of Artificial Intelligence*; Dec. 17, 2020; pp. 1-13; vol. 2; ArXiv.org, Cornell University; Ithaca, NY, USA.

Sun, Rui et al.; "Multi-modal Knowledge Graphs for Recommender Systems"; *Proceedings of the 29th ACM International Conference on Information & Knowledge Management*; Oct. 19, 2020; pp. 1405-1414; ACM Publications; New York, NY, USA.

Wu, Xinxiao et al.; "Anticipating Future Relations via Graph Growing for Action Prediction"; *Proceedings of the 35th AAAI Conference of Artificial Intelligence*; May 18, 2021; pp. 2952-2960; vol. 35, No. 4; Association for the Advancement of Artificial Intelligence; Washington, D.C., USA.

* cited by examiner

INFORMATION AGGREGATION IN A MULTI-MODAL ENTITY-FEATURE GRAPH FOR INTERVENTION PREDICTION

CROSS REFERENCE TO RELATED APPLICATIONS

This application is a U.S. National Phase application under 35 U.S.C. § 371 of International Application No. PCT/EP2021/063020, filed on May 17, 2021. The International Application was published in English on Nov. 24, 2022 as WO 2022/242827 A1 under PCT Article 21(2).

FIELD

Embodiments of the present invention relate to systems and computer-implemented methods for providing event-specific intervention recommendations.

BACKGROUND

In many situations, data has to be aggregated from various sources in order to make an informed decision. This aggregation can be time consuming for humans and even the aggregation might contain too much information for a person to handle. Both aspects become especially crucial under time-constraints and high-pressure tasks, e.g. in emergency events. For example, a human operator of an emergency hotline needs to (a) listen to the incoming caller who describes the problem, (b) search the available database for relevant information and (c) make a potential life-or-death intervention decision (e.g. which police unit to call) on how to best help the caller with their problem.

In this context, Ruin Sun et al.: "Multi-modal Knowledge Graphs for Recommender Systems", in CIKM '20: Proceedings of the 29th ACM International Conference on Information & Knowledge Management, October 2020, pages 1405-1414 (https://doi.org/10.1145/3340531.3411947) discloses a multi-modal knowledge graph attention network to better enhance recommender systems by using multi modal knowledge. A multi modal graph is used to present the aggregated embedding representation from different dataset for recommendation. A scoring function of each triple corresponding to entities is computed.

In terms of displaying an entity-feature graph, Sharifzadeh et al.: "Classification by Attention: Scene Graph Classification with Prior Knowledge", in Proceedings of the 35th AAAI Conference of Artificial Intelligence, 2021 discloses building a scene graph from videos which they enrich with a schema.

In terms of predictions based on a scene graph, Wu et al.: "Anticipating Future Relations via Graph Growing for Action Prediction", in Proceedings of the 35th AAAI Conference of Artificial Intelligence, 2021 discloses taking a video stream, convert it to a graph and predict which action is currently being executed.

SUMMARY

In an embodiment, the present disclosure provides a method for providing event-specific intervention recommendations, the method comprising: identifying, based on an event trigger, one or more sensors; determining, by processing data streams provided by the identified sensors, a set of event related entities and constructing, for each entity of the determined set of entities, an associated feature vector of features of the each entity; generating, based on the determined entities and their respective feature vector, an entity-feature-graph; computing, by performing graph classification of a predefined set of allowed interventions based on a trained graph classification model, a ranked list of interventions; and selecting, according to predefined rules, one or more interventions from the ranked list of interventions and providing the selected interventions as recommended interventions for execution. The method can be used to support decision making.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
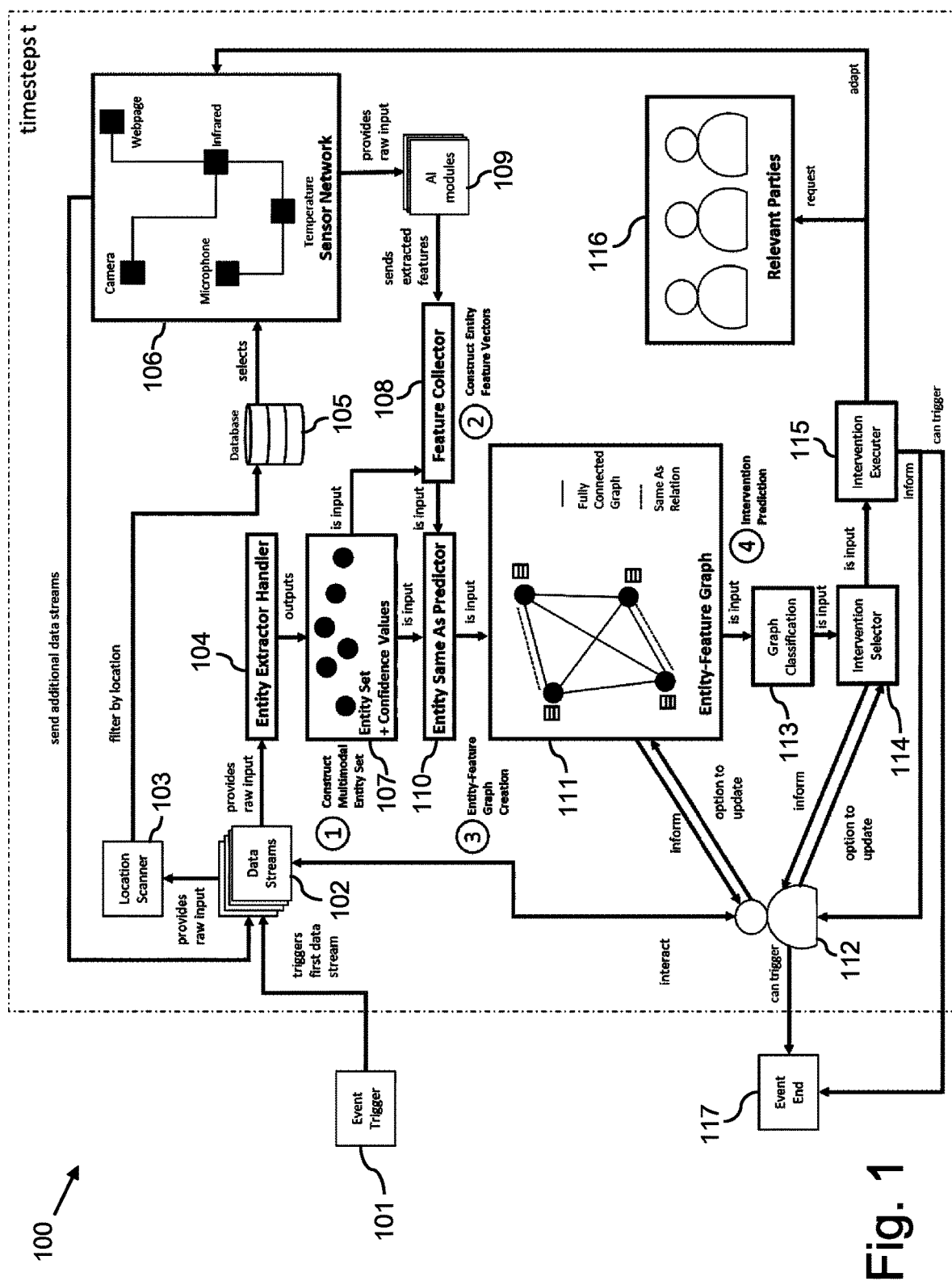
FIG. 1 is a schematic view illustrating the general architecture of a system for providing event-specific intervention recommendations in accordance with an embodiment of the present invention.

In accordance with an embodiment, the present invention improves and further develops a method and a system of the initially described type in a way that enables making informed decisions in a reliable and efficient way, in particular in the context of time-constrained and high-pressure tasks, such as in case of emergency events.

In accordance with an embodiment, the present invention provides a method for providing event-specific intervention recommendations, the method comprising: identifying, based on an event trigger, one or more sensors; determining, by processing data streams provided by the identified sensors, a set of event related entities and constructing, for each entity of the determined set of entities, an associated feature vector of the entity's features; generating, based on the determined entities and their respective feature vector, an entity-feature-graph; computing, by performing graph classification of a predefined set of allowed interventions based on a trained graph classification model, a ranked list of interventions; and selecting, according to predefined rules, one or more interventions from the ranked list of interventions and providing the selected interventions as recommended interventions for execution.

Embodiments of the present invention provide an automated system that provides the advantage of aggregating information in an emergency event faster than a human operator. The information may be displayed succinctly as an entity-event graph and the system may be configured to return a ranked list of recommended interventions. The system may be configured to either work autonomously by executing recommendation(s), e.g., the highest ranked one(s), or it can work with a human in the loop. The latter scenario would reduce the cognitive burden of the human operator who can then make better informed decisions.

According to embodiments, the present invention relates to information aggregation in a multi-modal entity-feature graph for intervention prediction and provides an automated system that collects relevant information about extracted entities participating in an event and summarizing it into an entity-feature-graph and predicts appropriate interventions at each time step. Entities may be extracted from different data streams with a confidence value and features may be constructed by consulting different sensors and Artificial intelligence modules, which may be trained from past events. A graph neural network may then predict the next intervention by considering the confidence values of each entity and which entities might be the same. The system may recommend interventions on how to best respond to the respective (emergency) event. The recommended intervention may be selected for execution and sensors network may be adapted accordingly (for instance, by adapting the position, location, and/or orientation of the sensors) to gather additional information.

According to an embodiment of the invention, the method comprises summarizing an event in a (multi-modal) entity-feature graph where entities are extracted from different data streams with a confidence value and where features of the entities are constructed by consulting different sensors and AI modules.

According to an embodiment of the invention, the method comprises an analysis of which entities from different modalities are likely the same. This information, together with the entity-feature graph may be given as input to a graph neural network. The graph neural network may then predict the next intervention(s) by considering a confidence values assigned to each entity and which entities might be the same. The confidence value may indicate a confidence level with which the respective entity has been extracted from available data streams.

It should be noted that providing the graph neural network, which will predict an intervention, the information of entity confidence values, improves the production performance since, without such confidence value, the verisimilitude is unknown and contradictory information from different data sources cannot be analyzed accordingly. Indeed, the system would have to pick one of them or ignore both. In both cases, the system is essentially not able to model the stream of information, which might go along with a loss of important information. Consequently, the recommended interventions would be less reliable.

According to an embodiment, it may be provided that intervention prediction can automatically move sensors which will directly impact the information that can be collected of the entity-feature graph in the next time step.

It should be noted that currently there are no systems that combine multiple data streams and represent them as an entity-feature graph to give an overview of an occurring event and then use this graph to recommend intervention predictions. The document by Sharifzadeh et al. as cited above builds a scene graph based on a video stream that is enriched with information from an external static knowledge source. In contrast, embodiments of the present invention provide a system that is configured to access multiple data streams to extract entities, which are then enriched by further systems (i.e. sensors and AI modules) with feature vectors that offer a more detailed description of the entities.

As such, systems according to embodiments of the invention can provide a more holistic view of an event. The document by Wu et al. as cited above describes a system configured to take a video stream, convert it to a graph and predict which action is currently being executed. In contrast, embodiments of the present invention provide a system configured to take a graph built from multiple data streams and to predict which action the system should take next, rather than what will happen next. Consequently, systems according to embodiments of the invention system can intervene at an event and do not act an observer.

The advantageous performance of the invention depends on usage scenarios, i.e., whether enough data sources/streams can be collected to build a reliable entity graph and corresponding entities' feature vectors. To predict appropriate interventions, it is crucial that an event is described comprehensively and with as much relevant information as possible. According to embodiments, this is achieved by the entity-feature graph creation. If instead only one data stream is considered (e.g. just a video stream), then crucial information will be missing and appropriate interventions cannot be predicted.

The advantageous performance of the invention also depends on having access to previous data sources with corresponding successful interventions (historical data). This is needed to train the AI components. Further, the possible inventions have to be chosen and defined appropriately by the user before starting the system, i.e., the user has to specify the options that are available (e.g. adjust the positions of drones, etc.).

Embodiments of the invention can be used in many applications where various sources of information (data streams) have to be considered simultaneously to analyze and evaluate a situation. For example, it can be used in any instance where sensor networks are available to observe a domain, such as in public safety, smart cities or health care. A differentiator to prior art decision support solutions is that methods and systems according to embodiments of the invention have the capability to combine multiple data streams, to consider the confidence of the information, and represent them as an entity-feature graph to give an overview of an occurring event and then use this graph to recommend intervention predictions.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing Nowadays, in many event-related situations, there is often more information available than a human can efficiently consume to make an informed decision. This is especially true in time-constrained and high-pressure tasks, such as in emergency events.

In view of this, embodiments of the present invention provides methods and systems that automatically aggregate relevant information in an entity-feature graph and recommend interventions on how to best respond to a specific event, e.g. an emergency event. The system can act both autonomously or with a human in the loop. As will be described in detail below, possible use cases are, for example, (1) a smart control room for police, or (2) autonomous regulation of traffic or buildings in a smart city.

Embodiments of the invention provide systems and methods that automatically extract entities participating in an event and that automatically collect relevant information about these entities. The extracted entities and the collected information about these entities may be aggregated in an entity graph with entity features. The resulting, called entity-feature graph herein, can then (a) be inspected and/or modified by a human operator and/or (b) an AI system. According to an embodiment, it may be provided that the entity-feature graph is given to the AI system, wherein the AI system may be trained based on past events. The AI system may be configured, e.g. based on a defined set of allowable interventions, to predict a ranked list of intervention recommendations.

The system may include an intervention executor module that is configured to execute the top ranked recommendation (or, depending on the implementation, a predefined number of the top ranked recommendations) from the ranked list of intervention recommendations. According to an embodiment, it may be provided that, before the intervention executor executes the top recommendation(s), the recommendations may be inspected and/or modified/adapted by a human operator.

Embodiments of the invention provide methods that include providing a set of entity types and a set of features. For example, for emergency event handling, entity types that are relevant with regard to the emergency event could include, e.g., a caller (notifying the competent authority of the emergency), a victim, and an offender. In this context, relevant features could include features like, e.g., 'has_weapon', 'is_known', 'is_wounded', and so on. Embodiments of the invention provide methods that access and utilize a set of available resources. For instance, such resources may include databases (e.g., a database that maps from locations to available sensors or databases with criminal records), sensors (e.g., cameras) or AI modules (e.g., a module to recognize weapons in videos).

FIG. 1 provides an illustrative example of a novel system for providing event-specific intervention recommendations according to an embodiment of the present invention.

The system 100 as shown in FIG. 1 may be under cyclic operation with time steps of configurable length and, as such, may be started up with a time step t=1 after a trigger signal is received from an external event trigger 101. The external event trigger 101 may originate, e.g., from a human calling an emergency hotline, a camera having detected suspicious activity, a sensor that records an abnormal value, to name just a few examples.

According to an embodiment, each event trigger forwards at least one data stream 102 to the system 100. A data stream may include any kind of data, for instance voice and/or video recordings, logs from smart devices, or the like.

As shown in FIG. 1, the data of the available data streams are provided as input to two system components in parallel, namely to a location scanner 103 and to an entity extractor handler 104. Generally, the location scanner 103 attempts to determine the location at which the triggered event is taking place, while the entity extractor handler 104 is configured to determine the entities involved in the triggered event.

Figure 2:
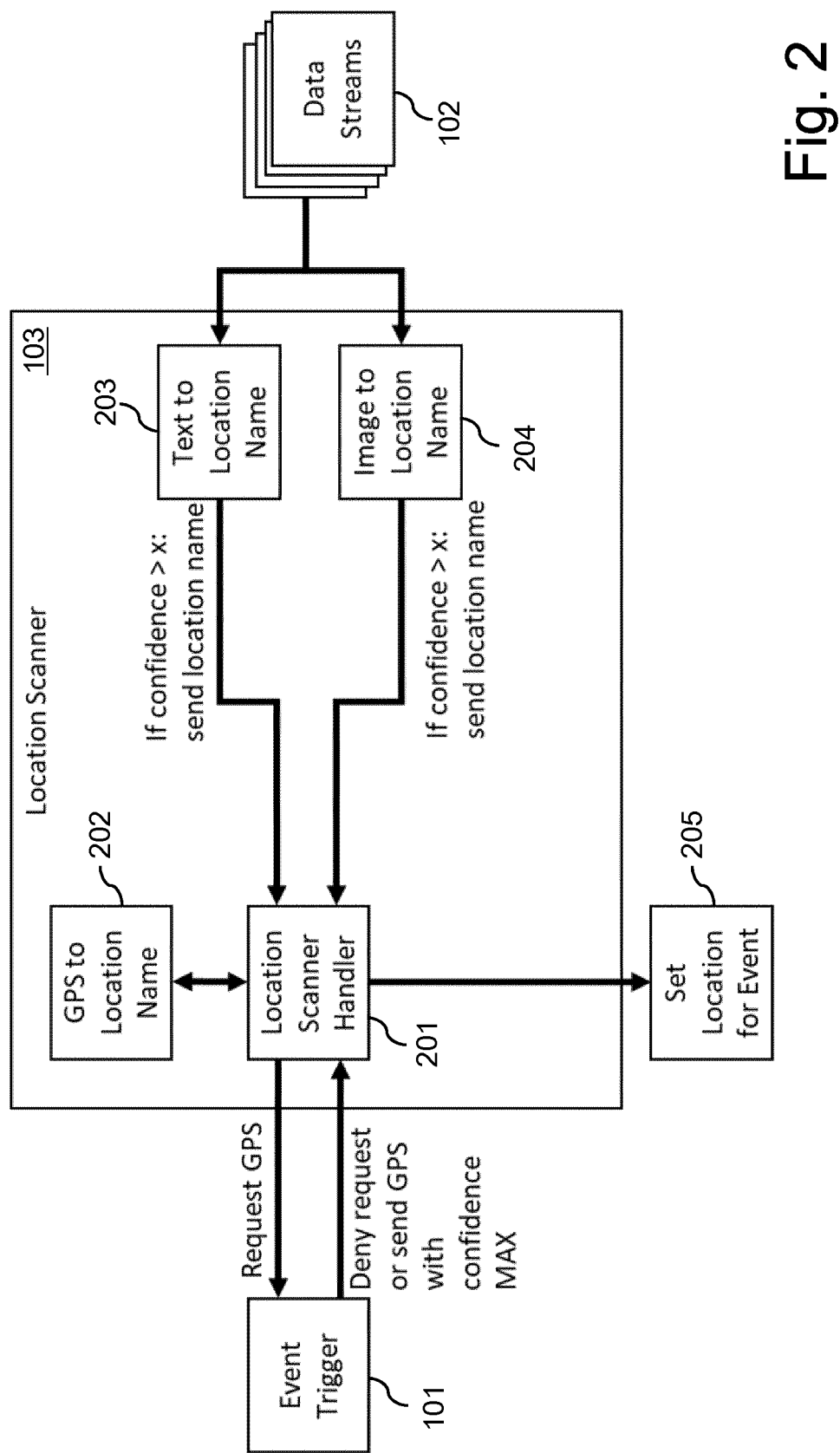
FIG. 2 is a schematic view illustrating a location scanner deployed in a system for providing event-specific intervention recommendations in accordance with an embodiment of the present invention.

FIG. 2 provides an illustrative example of a location scanner according to an embodiment of the present invention, in particular for deployment as location scanner 103 in the system 100 of FIG. 1. In this context it should be noted that throughout the figures like reference numbers are used for like or similar components or functions, unless specifically indicated otherwise.

According to an embodiment, it may be provided that the location scanner 103 includes a communication module, denoted location scanner handler 201 in FIG. 2. The location scanner handler 201, upon receiving a first data stream pertaining to a triggered event at the location scanner 103, may be configured to request—directly or indirectly—a location signal from the respective event trigger 101, for instance in form of a GPS signal.

If the location scanner handler 201 receives a location signal (e.g. GPS) from the event trigger 101, a separate module, denoted 'GPS to Location Name module' 202 in FIG. 2, may map the received location information to a location name. This may be performed by using a location mapping service, such as, e.g., OpenStreetMap.

On the other hand, if the event trigger 101 cannot provide a location, the location scanner 103 may be configured to attempt to determine the location of the triggered event by analyzing the one or more data streams received in relation to the triggered event. To this end, according to an embodiment of the invention, the location scanner 103 may include a 'Text to Location Name' module 203 that is configured to process text. For instance, module 203 may be a configured to scan the text contained in data streams for a location name. If the data stream is speech, a pre-connected module (not shown) may first convert speech to text (for instance, by applying an available solution described at https://cloud.google.com/speech-to-text), before the text is then forwarded to the 'Text to Location Name' module 203.

According to an embodiment, the location scanner 103 may also include an 'Image to Location Name' module 204 that is configured to scan images from a video and, based thereupon, to attempt to recognize the location of the triggered event. This module could be implemented as a Region Based Convolution Neural Network (R-CNN) for object detection as described, for instance, in Girshick, Ross, et al. "Rich feature hierarchies for accurate object detection and semantic segmentation", in Proceedings of the IEEE conference on computer vision and pattern recognition, 2014, which is hereby incorporated herein by reference.

Both modules 203, 204 may be configured to assign confidence values to their determined location results, depending on how reliably they managed to determine the respective location based on the available information. If either module 203, 204 finds a location with a certain confidence about a predefined threshold, this location may be sent to the location scanner handler 201.

According to an embodiment, once the location scanner handler 201 receives a location from any of the modules 203, 204, it will set the location for the event for the respective time step, as shown at 205 ("Set Location for Event"). If more than one location is received (for instance, location 'A' from module 203, and a different location 'B' from module 204; or location 'A' from module 203 with a first confidence value and a different location 'B' from the same module 203 with a second confidence value), the location scanner handler 201 may be configured to choose one location, e.g. the one with the highest confidence, that is set as the location for the respective event at 205.

The location set for the event at 205 will be used by the system 100 to determine, for instance by retrieving respective information from a dedicated database 105, which sensors or AI modules are relevant or can be used for a given location, as shown in FIG. 1 at step "Filter by location". According to embodiment, if additional sensors are found, they may be selected and the respective data streams may be added as additional data streams to the set of data streams, as shown in FIG. 1 at step "Send additional data streams".

For instance, additional sensors may include cameras, microphones, temperature sensors, infrared sensors, webpages or the like, which are depicted in FIG. 1 as part of a sensor network 106.

As already mentioned above, according to an embodiment of the invention, the system 100 includes an entity extractor handler 104 that is configured to determine the entities involved in the triggered event. The entity extractor handler 104 may be provided with the raw data of the data streams 102 as input, as shown in FIG. 1. The entity extractor handler 104 may include a number of different components that are triggered depending on the modality of the data streams 102.

Figure 3:
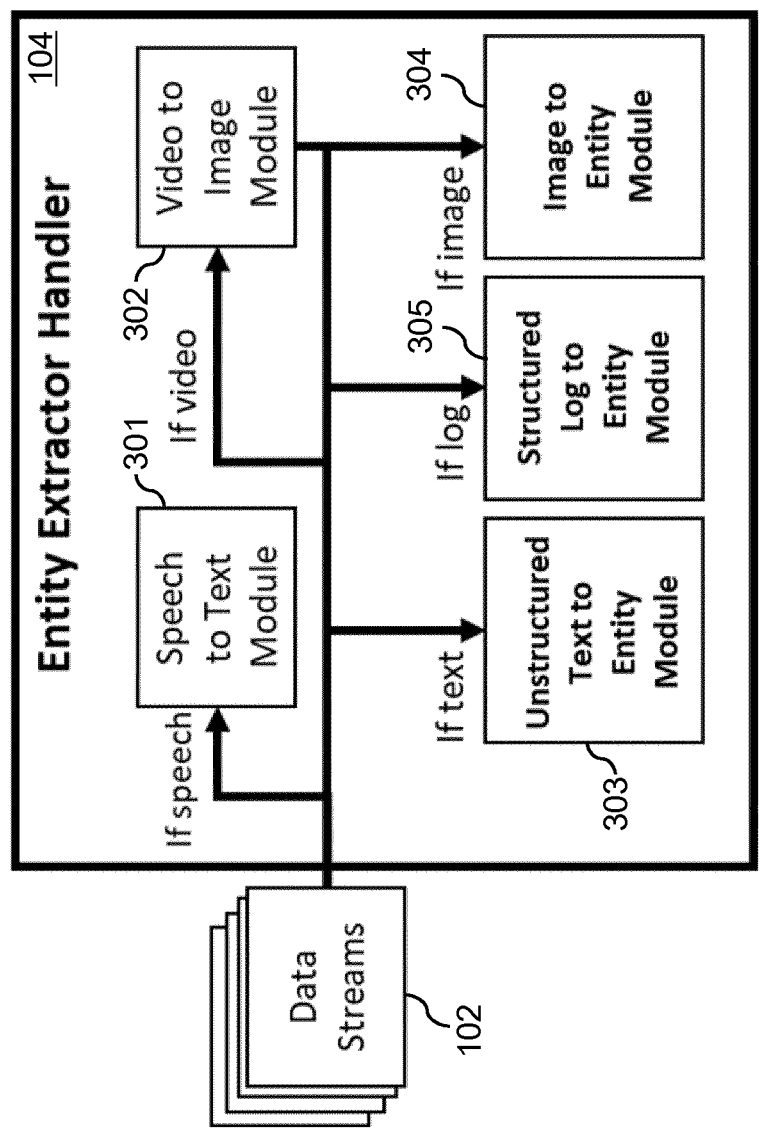
FIG. 3 is a schematic view illustrating an entity extraction handler deployed in a system for providing event-specific intervention recommendations in accordance with an embodiment of the present invention.

An exemplary embodiment of the entity extractor handler 104 is shown in FIG. 3. According to this embodiment, the entity extractor handler 104 includes a "Speech to Text Module" 301 that is configured to receive data streams 102 containing speech and to convert the speech into text. Furthermore, the entity extractor handler 104 includes a "Video to Image Module" 302 that is configured to receive data streams 102 containing video and to split the video into a set of images. Text (either from a data stream 102 or as output of the "Speech to Text Module" 301) may be sent to a "Text to Entity Module" 303. Images (either from a data stream 102 or as output of the "Video to Image Module" 302) may be sent to an "Image to Entity Module" 304. Data streams 102 from devices that are sent in the form of logs (i.e., structured data) may be sent to a "Log to Entity Module" 305.

According to an embodiment, given text as input, the "Text to Entity Module" 303 may be configured to predict how many and which entity types are mentioned in the text.

According to an embodiment, given an image as input, the "Image to Entity Module" 304 may be configured to place bounding boxes around recognized entities and to label each box with an entity type.

According to an embodiment, given a log file as input that might specify additional relevant entities in a structured manner, the "Log to Entity Module" 305 may be configured to parse the log file to extract the additional relevant entities.

Again, like in the case of the location scanner 103, it may be provided that each module of the entity extractor handler 104 is configured to assign each extracted relevant entity a confidence value that specifies how reliably the module managed to determine the respective relevant entity based on the available information. According to an embodiment, it may be provided that the entity extractor handler 104 records for each extracted entity from which module it stems and how confident that module was in its prediction.

As shown in FIG. 1, the output of the entity extractor handler 104 is a set of entities 107 that are considered relevant with regard to the triggered event, together with the respectively assigned confidence values.

Next, according to an embodiment of the invention, the set of entities 107 determined by the entity extractor handler 104 is sent to a "Feature Collector" module 108, which may be configured construct, for each entity of the received set of entities 107, a corresponding vector of the entity's features, i.e. to attempt to obtain features of the entities and to fill, for each entity, a feature vector with the features obtained for the respective entity. To accomplish this task, the feature collector 108 may have access to the location (e.g., as determined by the location scanner 103), relevant databases 105, relevant sensors (e.g. sensors of sensor network 106) and a set of AI modules 109 (e.g., text/token classifier, object recognizers, etc.). With the location set, the feature collector module 108 can determine which of the available sensors and AI modules 109 are relevant.

To determine whether a feature of an entity can be set and what its value should be, the feature collector module 108 may operate in the following manner: Generally, the feature collector module 108 is given the information about which input device type (that is, for each of the available sensors and each of the available AI modules) can provide which feature of an entity's feature vector. The feature collector module 108 may then be configured to request and obtain the features from the respective devices.

More specifically, according to an embodiment the feature collector module 108 may be provided with a set of rules specifying how to construct the feature vectors. For instance, the set of rules may include instructions on how multiple values for the same feature can be aggregated. The feature collector module 108 may then iterate over each entity in the set of entities 107 and each feature for an entity and may look up which of the devices can fill this feature. For each such device, the feature collector module 108 requests a response. If the respective device responds that it can fill the feature in this particular instance, the feature collector 108 notes down the value for this feature and from which device this value comes. Once the feature collector 108 communicated with each device for this feature, it aggregates all feature values via an aggregation function specified in the set of rules for this feature type. Examples for aggregation could be a (weighted) average, a maximum or even another AI module that has been trained to compute the final feature value.

As shown in FIG. 1, according to an embodiment, once each entity's feature vector has been filled, the entity set 107 and the feature vectors are sent to an "Entity Same As Predictor" module 110. This module 110 may be configured to determine for each entity-entity pair of the set of entities 107 how likely it is that they are the same entity. The module 110 may accomplish this task, e.g., by executing a Graph Neural Network (GNN) trained on historical data. The "Entity Same As Predictor" module 110 may be configured to output a zero value for a particular pair of entities if the predictor module 110 considered the two entities to be different. On the other hand, it may output a non-zero value for a particular pair of entities if the two entities are considered to be the same, wherein the non-zero value may reflect a weight that indicates how likely the predictor module 110 considered the two entities to be the same.

It should be noted that if the graph neural network, which will predict an intervention, is not given the information which entities are likely the same, then the system essentially does not know whether different information streams describe different or the same entity. As consequence, the system is not able to understand, e.g., how many people are actually involved, be it attacker or injured. Hence, providing the information which entities are likely the same significantly reduces the error variance and, consequently, the recommended interventions are more reliable.

Next, an "Entity-Feature Graph" 111 may be built based on the entities and their respective feature vector, wherein the entities with their associated feature vector are the nodes of the graph. According to an embodiment of the invention, two edge types may be defined for the graph. For instance, for a first type, each entity of the entity set 107 may simply be connected with every other entity of the entity set 107 (fully connected graph, as indicated in FIG. 1 by the solid lines). The strength of this connection can later be learnt, for example, with a transformer neural network. A second type may define an edge between two entities if the "Entity Same As Predictor" module 110 returned a non-zero value for these two entities (as indicated in FIG. 1 by the dashed lines). Optionally, the edge can be assigned the weight that equals how likely the predictor module 110 considered the two entities to be the same.

According to an embodiment of the invention, it may be provided that both the entity-feature graph 111 and the relevant entity set 107 are forwarded to a human operator 112 to succinctly inform them about the event's status at the current time step. As shown in FIG. 1, the human operator 112 may update the entity-feature graph 111 in any manner, e.g. by correcting feature values or by merging the entities differently.

According to an embodiment of the invention, the entity-feature graph 111 may be forwarded (either directly or after update by a human operator 112) to a "Graph Classification" module 113. An exemplary embodiment of the functionality of the graph classification module 113 is shown in FIG. 4.

According to an embodiment, it may be provided that the graph classification module 113 has access to a set of predetermined possible interventions. The module 113 may take the entity-feature graph 111 as its input and may convert it to a hidden representation that incorporates the confidence values for each entity as it was assigned by the original feature extractor 108. Based on this, the module 113 may assign each intervention of the set of predetermined possible interventions a score, where the highest score indicates that the module 113 believes this to be the most promising intervention that will have a positive impact on the event. The module 113 can for example be a heterogeneous graph neural network.

Figure 4:
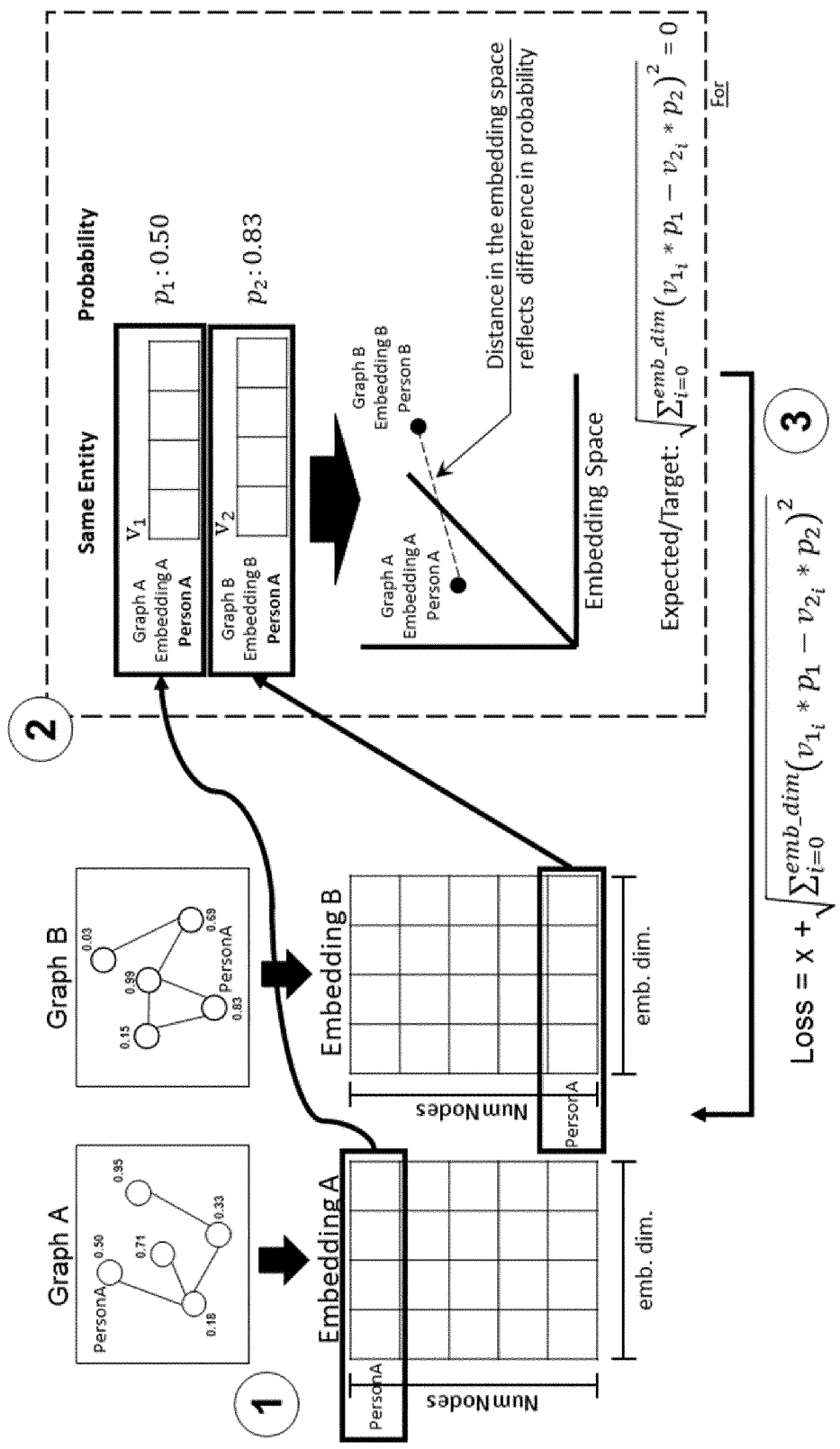
FIG. 4 is a schematic view illustrating a graph classifier of a system for providing event-specific intervention recommendations in accordance with an embodiment of the present invention.

As is shown in FIG. 4, during the training of a graph classification model, the learning process may consider the assigned probability values of the entities and their relations. In particular, it may be provided that the step that transforms the graph into the embedding space, makes use of the distance between embeddings to encode the probabilities. Assuming that the same entity occurs in two or more graphs, which are part of the training set, the training process may adapt the respective embeddings in a way that the resulting distance in the embedding space reflects the distance of the respective probability values. A possible instantiation could be that the respective embeddings are simply multiplied by the probability value and the training process tries to understand how to embed the entities so that the resulting vectors are equal (after the multiplication). This would ensure that identical graphs with different probability values do not have the same embeddings, but the average distance of the graphs in the embedding space reflects the similarity through the probability.

Based on the scores assigned to the interventions, the graph classification module 113 may generate a ranked list of interventions. According to an embodiment of the invention, this list may be forwarded to an "Intervention Selector" module 114, as is shown in FIG. 1. The intervention selector module 114 may be configured to select, for instance based on predefined rules, which interventions should be executed, e.g. the highest ranked. The intervention selector module 114 may also optionally communicate with the human operator 112, for instance by providing them information on the ranked list and the chosen interventions. The human operator 112 may then modify either part and send this back to the intervention selector module 114. If the ranked list was updated, the interventions-to-be-executed are reselected and the human operator 112 may be updated by sending the updated chosen interventions.

According to an embodiment, once no more updates are made, the chosen interventions are sent to "Intervention Executor" 115, which may then execute the chosen interventions. In addition to the intervention execution, the intervention executor 115 may perform further actions, which may include any combination of the following: requesting additional parties 116 (e.g. police units), adapting sensors in the sensors network 106 (e.g. redirecting traffic flows by adapting switching of traffic lights), and/or informing human operator 112.

Once the intervention executor 115 is triggered, the process then proceeds to the next time step t+1, where any further data incoming from data streams 102 will be processed by the system 100. According to embodiments, any newly found entities are merged and added to the entity-feature graph 111 from the previous time step t. The end 117 of an event may be triggered either by the human operator 112 or the intervention executor 115.

According to an aspect of the invention, the method comprises aggregating information for an event from multiple data streams in a feature-entity graph and predicting appropriate interventions at each time step, based on the following preconditions:
  a list of available data streams or sensors and respective AI modules to interpret them;
  a database (such as database 105 shown in FIG. 1) that provides information about the availability and the location of the sensors; and
  A list of entity types of interest and respective features of interest.

According to an embodiment, the method may comprise the following initialization steps:
  Define a set of allowed interventions.
  Obtain data streams and interventions of past events.
  Use this information to train the AI modules (in particular, the "Entity Same As Predictor" module 110 and the Graph Classifier 113). Generally, potential training data can be extracted from historical data streams and previous decisions.

According to an embodiment, the method may comprise the following execution steps:
  Identify relevant sensors and read the data streams 102 (for instance, performed by the Location Scanner 103 and the Feature Collector 108, respectively).
  Fuse the data into a single representation (for instance, performed by the Entity Extractor 104 and the "Entity same As Predictor" 110).
  Perform graph classification to compute ranked list of interventions (for instance, performed by the Entity-Feature Graph 111, Graph Classification 113)
  Select intervention and adapt the sensor network accordingly or forward intervention (for instance, performed by the Intervention Selector 114 and the Intervention Executor 115, respectively).

Embodiments of the present invention can be implemented in the context of various application scenarios. Hereinafter, a number of exemplary use cases are outlined in some more detail:

1. Public Safety: Control Room

A control room or operations room is a room serving as a central space where a large physical facility or physically dispersed service can be monitored and controlled. As a consequence, various units like call handlers, police in the field, but also the infrastructure (e.g. cameras) can be considered as continuous stream of information. This information is the base for decision making, e.g., in terms of operation management. One possible situation is a hostage situation. In such a situation, implementing a system in accordance with the present invention enables to merge and frame all incoming information that describe the same event into a single representation including all uncertainties in respect to the present information. Subsequently, the system may evaluate the aggregated data to come up with an intervention recommendation. The output of the system can be used to adjust a monitoring sensor networks, e.g. drones (unmanned aerial vehicles) equipped with cameras. Those unmanned aerial monitoring vehicles can be automatically adjusted to improve monitoring of the current situation. These systems can be directly adjusted either with or without the human in the loop.

2. Smart City: Smart Building

Smart buildings (e.g., hotels or stadiums) have sensor networks including, among others, cameras, microphones, presence sensor, and smoke sensors but also have online presence (e.g., social media profiles). For recognizing, analyzing, and understanding a certain situation, a system implemented in accordance with the present invention may fuse different information sources, which describe the same scene, into a single representation. Subsequently, the situation may be classified, e.g., whether everything is normal or something is odd. For instance, in case of a fight between people, the system implemented in accordance with the present invention is able to understand how many people are involved and whether they use weapons. As an intervention, the system can send a command to a central control unit, which can close or open doors and windows automatically, e.g. with the aim of separating people, but also to avoid that further people are involved in the conflict. Furthermore, the system may continue to monitor the situation, update the representation and might suggest further interventions or adapt the position of sensors (e.g. orientation of cameras).

3. Health Care: Patient Assistant

After a surgical operation, it is important to support (especially elderly) people during their daily routine. The loss of self-confidence and the change in behavior to prevent issues in everyday situations can cause a physical as well as a psychological decline in health, which in turn results in a premature death. A pervasive health care system can help to observe the daily routine of a person and support him/her, e.g., during recovery. Assuming a smart-home, a system implemented in accordance with the present invention is able to provide interventions, which result from the persons activities, i.e., it makes use of presence, temperature, sound-level, door, and interaction sensors to take snapshots of the current situation. Thus, the snapshot, i.e., entity-feature graph, depicts situations like "Watching TV". Then, the snapshot may be classified (based on historical data), i.e., the intervention is determined. For instance, assuming that a person got a new artificial joint, depending on the effort during the day, an embodiment of the present invention can rely on the classification results to adapt the level of difficulty of sports equipment (e.g. a home trainer). In particular, the system learned, e.g., that the scenery "watching TV" can lead to the intervention "increase the level of difficulty of the home trainer". Alternatively, in case of an accident, a system according to an embodiment of the present invention would recognize the scenery as such and would recommend as a possible intervention to call an emergency doctor. Hence, the system may deliver this information to a smart routing system, which may automatically establish a phone connection with the right person.

4. Smart Retail: Personalized Advertisement

A smart retail usually stands for autonomous shopping, i.e., people just walk through the store and take what they need and the recognition of what they took but also the payment happens automatically. Such stores are equipped with cameras, RFID sensors, Wifi signals, but also Bluetooth transmitter. A system implemented in accordance with the present invention may unify this information about people and products, i.e., to represent which people belong together (e.g., a couple), but also which product was taken by which person. Therefore, the system is able to derive from the situation, i.e., whether the groceries belong, e.g., to a family or a single, but also whether it is the weekly shopping or a quick errand, possible interventions. For instance, a possible intervention might be to adapt the screens at the exit of the retail so that they show personalized advertisements when the actual customer walks by. As a follow-up, the invention is also able to capture that scenery to evaluate the outcome of the action (showing a specific ad). A consequence (i.e., possible intervention) might be that a robot of the smart retail is instructed to adapt the location of certain products.

5. Natural Disaster: Rescue & Resource Coordination

During a natural disaster, such as an earthquake, it is important to efficiently, reliably and quickly coordinate the rescue operations and allocate available resources. When a disaster occurs, affected people often share their issues and observations via social media, be it as text, video or image. It is near impossible for a human to consume and react to this flood of information. In contrast, a system implemented in accordance with the present invention can take all these data streams as input and represent the current status of the event in an entity-feature graph. Possible intervention include requesting more information from certain users, deciding where to send sensor-equipped drones to obtain further information, as well as coordinating rescue operations and allocating resources.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing event-specific intervention recommendations, the method comprising:
    identifying, based on an event trigger, one or more sensors;
    determining, by processing data streams provided by the identified sensors, at least one of the data streams including video data, a set of event related entities and constructing, for each entity of the determined set of entities, an associated feature vector of features of the each entity;
    generating, based on the determined entities and their respective feature vector, an entity-feature-graph;
    computing, by performing graph classification of a predefined set of allowed interventions using a trained graph classification model that takes as input the entity-feature-graph, a ranked list of interventions, wherein the trained graph classification model was trained by a learning process that considers confidence values assigned to each of the entities of the determined set of entities within the entity-feature-graph, the confidence values indicating confidence levels with which respective ones of the entities have been extracted from available data streams, and wherein the entity-feature-graph has been transformed into an embedding space stored in a vector database by a transformation process that makes use of distances between each pair of entities in the embedding space to encode corresponding probabilities that respective pairs of the entities are the same; and
    selecting, according to predefined rules, one or more interventions from the ranked list of interventions and providing the selected interventions as recommended interventions for execution.

2. The method according to claim 1, wherein a feature vector of an entity is filled with features of the respective entity obtained by consulting available sensors and AI modules.

3. The method according to claim 1, wherein the graph classification is performed using a graph neural network.

4. The method according to claim 1, wherein the graph classification model is learned based on training data extracted from historical data streams and previous intervention selection decisions.

5. The method according to claim 1, wherein a location of the event is determined by analyzing received data streams provided by the identified sensors.

6. The method according to claim 5, wherein determining a location of the event comprises:
    processing text contained in one or more of the data streams and scanning the text for a location information, and/or
    processing the video data contained in the at least one of the data streams, which is the basis for decision making, and scanning images from the video data for the location information.

7. The method according to claim 1, further comprising: identifying, based on the selected interventions, further sensors and/or adapting the characteristics of already identified sensors including positions of the sensors, orientation of the sensors, and or sensitivity of the sensors.

8. The method according to claim 1, wherein the selected interventions are used to support a decision making process to select a subset of the selected interventions for execution.

9. The method according to claim 1, wherein providing the selected interventions comprises optimizing the selected interventions to select an optimal intervention for execution.

10. The method according to claim 1, wherein the selected interventions are for a health care system to support decision making for a medical patient.

11. A system for providing event-specific intervention recommendations, the system comprising one or more processors configured to
    identify, based on an event trigger, one or more sensors;
    determine, by processing data streams provided by the identified sensors, at least one of the data streams including video data, a set of event related entities and construct, for each entity of the determined set of entities, an associated feature vector of features of the entity;
    generate, based on the determined entities and their respective feature vector, an entity-feature-graph;
    compute, by performing graph classification of a predefined set of allowed interventions using a trained graph classification model that takes as input the entity-feature-graph, a ranked list of interventions, wherein the trained graph classification model was trained by a learning process that considers confidence values assigned to each of the entities of the determined set of entities within the entity-feature graph, the confidence values indicating confidence levels with which respective ones of the entities have been extracted from available data streams, and wherein the entity-feature-graph has been transformed into an embedding space stored in a vector database by a transformation process that makes use of distances between each pair of entities in the embedding space to encode corresponding probabilities that respective pairs of the entities are the same; and
    select, according to predefined rules, one or more interventions from the ranked list of interventions and provide the selected interventions as recommended interventions for execution.

12. The system according to claim 11, comprising a graph classification module configured to perform the graph classification using a graph neural network.

13. The system according to claim 11, comprising a location scanner module configured to analyze data streams provided by the identified sensors to determine a location of the event.

14. The system according to claim 11, comprising a feature collector module configured to utilize a set of AI modules to fill the features of a respective feature vector of each entity.

15. The system according to claim 11, comprising an intervention selector module configured to select the one or more interventions for execution and to adapt, based on the selected interventions, sensors to impact the information that are collected for the entity-feature-graph in a subsequent time step.

16. The system according to claim 11, wherein the one or more identified sensors comprise:
    a number of cameras covering a predefined surveillance area;

cameras, microphones, presence sensors and/or smoke sensors forming a sensor network of a smart building;
presence, temperature, sound-level, door, and/or interaction sensors forming a sensor network of a smart-home; and/or
cameras, RFID sensors, Wifi signals, and/or Bluetooth transmitters forming a sensor network of a smart retail store.

* * * * *